(12) United States Patent
Oya

(10) Patent No.: US 8,593,084 B2
(45) Date of Patent: Nov. 26, 2013

(54) AUXILIARY POWER SUPPLY DEVICE AND ELECTRIC POWER STEERING DEVICE

(75) Inventor: Toshiaki Oya, Sakai (JP)

(73) Assignee: JTEKT Corporation, Osaka-shi (JP)

( * ) Notice: Subject to any disclaimer, the term of this patent is extended or adjusted under 35 U.S.C. 154(b) by 539 days.

(21) Appl. No.: 12/920,191

(22) PCT Filed: Feb. 25, 2009

(86) PCT No.: PCT/JP2009/053370
§ 371 (c)(1),
(2), (4) Date: Aug. 30, 2010

(87) PCT Pub. No.: WO2009/107638
PCT Pub. Date: Sep. 3, 2009

(65) Prior Publication Data
US 2011/0000736 A1    Jan. 6, 2011

(30) Foreign Application Priority Data
Feb. 29, 2008  (JP) .................................. 2008-049332

(51) Int. Cl.
*H02P 1/00*  (2006.01)
(52) U.S. Cl.
USPC .......................................... 318/139; 320/128
(58) Field of Classification Search
USPC ............................................ 320/128; 318/139
See application file for complete search history.

(56) References Cited

U.S. PATENT DOCUMENTS

| 6,068,078 A | 5/2000 | Rau et al. |
| 6,727,669 B2 * | 4/2004 | Suzuki et al. ................. 318/139 |
| 2001/0021103 A1 * | 9/2001 | Takagi ........................... 361/752 |
| 2009/0056661 A1 * | 3/2009 | Cook et al. ................. 123/179.3 |

FOREIGN PATENT DOCUMENTS

| JP | 6 64550 | 3/1994 |
| JP | 8 107696 | 4/1996 |
| JP | 2000 16321 | 1/2000 |
| JP | 2003 320942 | 11/2003 |
| JP | 2005 67414 | 3/2005 |
| JP | 2005 287222 | 10/2005 |
| JP | 2007 91122 | 4/2007 |
| JP | 2007 153079 | 6/2007 |
| JP | 2007 223510 | 9/2007 |
| JP | 2007 290471 | 11/2007 |

* cited by examiner

*Primary Examiner* — Edward Tso
*Assistant Examiner* — Johali Torres Ruiz
(74) *Attorney, Agent, or Firm* — Oblon, Spivak, McClelland, Maier & Neustadt, L.L.P.

(57) ABSTRACT

An auxiliary power supply device that can always supply stable auxiliary power at the time of using an auxiliary power source and an electric power steering device employing the auxiliary power supply device are provided. In the auxiliary power supply device including a discharge circuit selectively constituting a state where a motor is supplied with power from only a battery and a state where the motor is supplied with power from a power source in which an auxiliary power source is connected in series to the battery by PWM control, when the power consumption of the battery is greater than an upper limit, a control circuit is provided which controls the power consumption to return to the upper limit by performing an electric power feedback control using a duty as an amount of operation at the time of turning on and off switching elements by a PWM control on the basis of the difference.

5 Claims, 5 Drawing Sheets

AUXILIARY POWER SUPPLY DEVICE AND ELECTRIC POWER STEERING DEVICE

TECHNICAL FIELD

The present invention relates to an electric power steering device that can generate steering assist force by the use of a motor, and more particularly, to an auxiliary power supply device of the electric power steering device.

BACKGROUND ART

An electric power steering device is a device that generates steering assist force by the use of a motor according to a driver's steering torque. Recently, a demand for an electric power steering device for large-sized vehicles has rapidly increased. The large-sized vehicles require an increasing of steering assist force. Therefore, further large electric power has to be supplied to a motor. However, a battery as a main power source alone may not supply such large electric power sufficiently. Therefore, a configuration is suggested in which the battery is provided with an auxiliary power source of a secondary battery, only the battery is used in a normal state, and the battery and the auxiliary power source are connected in series to each other to supply electric power from both power sources when the larger electric power is required (for example, see Patent literature 1).

DISCLOSURE OF THE INVENTION

Technical Problem

In the auxiliary power source of the prior electric power steering device having the above-mentioned configuration, a charging condition or a terminal voltage is not constant and often varies. Therefore, there is no guarantee that stable auxiliary power is always supplied at the time of using the auxiliary power source, and the actual amount of electric power to be supplied from the auxiliary power source is not fixed.

In consideration of this problem, an object of the invention is to provide an auxiliary power supply device that can always supply stable auxiliary power at the time of using an auxiliary power source and an electric power steering device employing the auxiliary power supply device.

Solution to Problem

According to an aspect of the invention, there is provided an auxiliary power supply device including: an auxiliary power source connected in series to a battery for supplying electric power to a motor; a power detecting section that detects power consumption of the battery; a charging circuit that charges the auxiliary power source by using the battery; a discharge circuit that selectively constructs a first state where the motor is supplied with electric power from only the battery and a second state where the motor is supplied with electric power from both the battery and the auxiliary power source by turning on and off a switching element; and a control circuit that performs an electric power feedback control of turning on and off the switching element by a pulse width modulation control with a duty based on a difference between the power consumption detected by the power detecting section and a first threshold value, wherein when the power consumption is greater than the first threshold value, the control circuit performs the electric power feedback control with the duty based on the difference so that the power consumption returns to the first threshold value.

In the auxiliary power supply device having the above-mentioned configuration, when the power consumption of the battery is greater than an upper limit (first threshold value), electric power corresponding to the difference is supplied from the auxiliary power source and the power consumption of the battery smoothly returns to the upper limit, by setting the duty on the basis of the difference in the electric power feedback control. In this case, even when the voltage of the auxiliary power source varies, it is possible to supply desired electric power from the auxiliary power source.

In the auxiliary power supply device, when the power consumption is within a range of the first threshold value and a second threshold value smaller than the first threshold value, the control circuit performs the electric power feedback control with a duty zero so that the discharge circuit constructs the first state.

In this case, when the power consumption of the battery is not greater than the upper limit (first threshold value) but is equal to or greater than a threshold value (second threshold value), the electric power feedback control is performed. Accordingly, it is possible to cause the discontinuity of control at the time of starting the electric power feedback control not to appear at the same time as the discharge start of the auxiliary power source. Accordingly, it is possible to prevent noise from being generated by repeatedly starting and stopping the switching of the switching element. It is also possible to prevent a variation in torque of the motor.

On the other hand, by setting the duty to zero, it is possible to nullify the electric power feedback control when the power consumption is equal to or greater than the threshold value and equal to or less than the upper limit. That is, it is not possible to perform a useless control to cause the power consumption equal to or less than the upper limit to get close to the upper limit.

Preferably, the control circuit stops the electric power feedback control when the power consumption is smaller than the second threshold value.

In this case, when the power consumption of the battery is small, no useless electric power feedback control need be performed.

Preferably, the control circuit includes a computing unit which computes the difference to output the duty, and the computing unit computes the difference when the control circuit performs the electric power feedback control.

According to another aspect of the invention, there is provided an electric power steering device for generating steering assist force by the use of a motor, including: a battery that supplies electric power to the motor; an auxiliary power source connected in series to the battery; a power detecting section that detects power consumption of the battery; a charging circuit that charges the auxiliary power source by using the battery; a discharge circuit that selectively constitutes a first state where the motor is supplied with electric power from only the battery and a second state where the motor is supplied with power from both the battery and the auxiliary power source by turning on and off a switching element; and a control circuit that performs an electric power feedback control of turning on and off the switching element by a pulse width modulation control with a duty based on a difference between the power consumption detected by the power detecting section and a first threshold value, wherein when the power consumption is greater than the first threshold value, the control circuit performs the electric power feedback control with the duty based on the difference so that the power consumption returns to the first threshold value.

In the electric power steering device having the above-mentioned configuration, when the power consumption of the battery is greater than an upper limit (first threshold value), electric power corresponding to the difference is supplied from the auxiliary power source and the power consumption of the battery smoothly returns to the upper limit, by setting the duty on the basis of the difference in the electric power feedback control. In this case, even when the voltage of the auxiliary power source varies, it is possible to supply desired power from the auxiliary power source.

Advantageous Effects of Invention

According to the auxiliary power supply device or the electric power steering device of the invention, the power consumption of the battery greater than the upper limit is smoothly returned to the upper limit by the auxiliary power corresponding to the difference. In this case, even when the voltage of the auxiliary power source varies, it is possible to supply the necessary electric power from the auxiliary power source. Therefore, it is possible to always supply stable auxiliary power at the time of using the auxiliary power.

EXPLANATION OF REFERENCES

1: AUXILIARY POWER SUPPLY DEVICE
2: ELECTRIC POWER STEERING DEVICE
7: BATTERY
8: CURRENT DETECTOR
9: VOLTAGE DETECTOR
10: AUXILIARY POWER SOURCE
12, 13: SWITCHING ELEMENT
15: DISCHARGE CIRCUIT
20, 20B: CONTROL CIRCUIT
21: CHARGING CIRCUIT

BEST MODE FOR CARRYING OUT THE INVENTION

Figure 1:
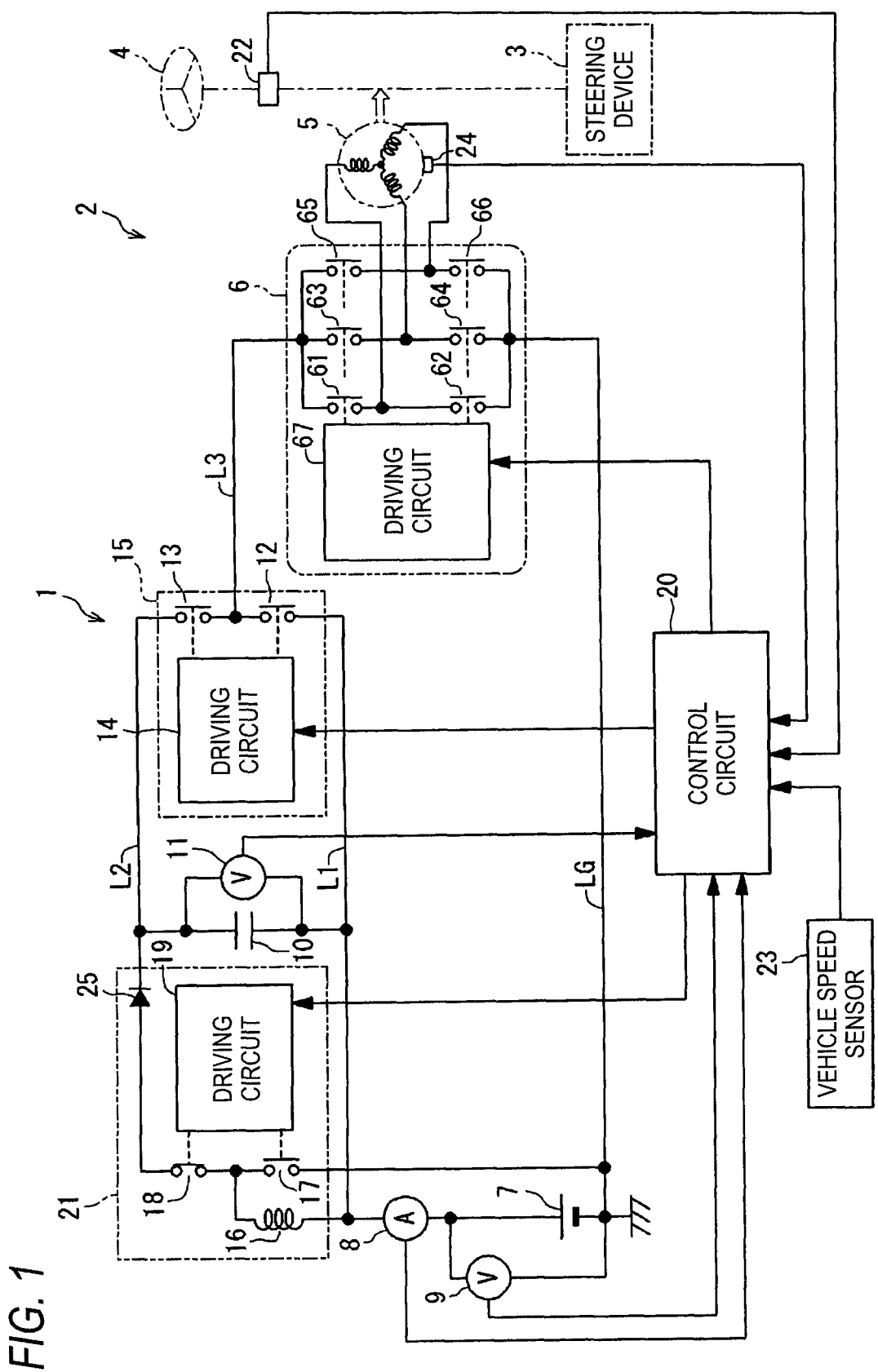
FIG. 1 is a circuit diagram illustrating the configuration of main electric circuits of an electric power steering device including an auxiliary power supply device according to an embodiment of the invention.

FIG. 1 is a circuit diagram illustrating the configuration of main electric circuits of an electric power steering device 2 including an auxiliary power supply device 1 according to an embodiment of the invention. In FIG. 1, a steering device 3 is driven by a driver's steering torque applied to a steering wheel (handle) 4 and a steering assist force generated by a motor 5. The motor 5 is a three-phase brushless motor and is driven by a motor driving circuit 6. The motor driving circuit 6 includes six switching elements (MOS-FET) 61 to 66 constituting a three-phase bridge circuit and a driving circuit (FET driver) 67 switching the switching elements. The driving circuit 67 is controlled by a control circuit 20.

The motor driving circuit 6 is connected to a negative electrode of a battery 7 via a ground-side electrical path LG. The battery 7 serves as a main power source and supplies electric power to the motor driving circuit 6. The battery 7 is connected in series to a current detector 8 and is connected in parallel to a voltage detector 9. The current detector 8 detects current (represented by "$I_B$") output from the battery 7 and sends the detection signal to the control circuit 20. The voltage detector 9 detects a voltage (represented by "$V_B$") across terminals of the battery 7 and sends the detection signal to the control circuit 20. The control circuit 20 performs a multiplication operation on the basis of two detection signals from the current detector 8 and the voltage detector 9 to calculate electric power ($V_B \cdot V_I$). That is, along with the control circuit 20, the current detector 8 and the voltage detector 9 constitute the power detecting section for detecting the power consumption of the battery 7. Strictly speaking, electric power is consumed in the battery 7, but this power consumption is very small relative to the electric power output to the outside. Therefore, the electric power output to the outside is assumed as the power consumption of the battery 7.

An auxiliary power source 10 is formed of an electrical double-layer capacitor and is connected in series to the battery 7. A voltage detector 11 is connected in parallel to the auxiliary power source 7. The voltage detector 11 detects a voltage (represented by "$V_C$") across terminals of the auxiliary power source 7 and sends the detection signal to the control circuit 20. Since the voltage drop in the current detector 8 is small, it is assumed that the voltage drop in the current detector is ignored. Then, the voltage $V_B$ of the battery 7 is applied to an electrical path L1 and a combined voltage ($V_B + V_C$) of the voltage $V_B$ of the battery 7 and the voltage $V_C$ of the auxiliary power source 10 is applied to an electrical path L2.

The electrical paths L1 and L2 are connected to an electrical path L3 via switching elements 12 and 13 (MOS-FET). The electrical path L3 is connected to the motor driving circuit 6. The switching elements 12 and 13 are switched with the application of a PWM (Pulse Width Modulation)-controlled driving signal from a driving circuit (FET driver) 14. The driving circuit 14 is controlled by the control circuit 20. A discharge circuit 15 including the switching elements 12 and 13 and the driving circuit 14 selectively constitutes a first state where the motor 5 is supplied with electric power from only the battery 7 and a second state where the motor 5 is supplied with electric power from a power source in which the auxiliary power source 10 is connected in series to the battery 7 by turning on and off the switching elements 12 and 13.

The auxiliary power source 10 is charged by a charging circuit 21. The charging circuit 21 includes a reactor 16, switching elements 17 and 18 (MOS-FET) which are alternately turned on, a driving circuit (FET driver) 19 switching the switching elements 17 and 18, and a diode 25. The driving circuit 19 is controlled by the control circuit 20.

An output signal of a torque sensor 22 which detects a steering torque applied to the steering wheel 4 is input to the control circuit 20. An output signal of a vehicle speed sensor 23 which detects a vehicle speed is input to the control circuit 20. The motor 5 includes an angle sensor 24 which detects a rotational angle position of a rotor. The output signal of the angle sensor 24 is input to the control circuit 20.

In the electric power steering device having the above-mentioned configuration, the control circuit 20 controls the motor driving circuit 6 to drive the motor 5 so as to generate appropriate steering assist force on the basis of a steering torque signal sent from the torque sensor 22, a vehicle speed signal sent from the vehicle speed sensor 23, and a rotor angular position signal sent from the angle sensor 24.

On the other hand, when the switching element 17 of the charging circuit 21 is in the ON state and the switching element 18 is in the OFF state, a current flows from the battery 7 via the reactor 16 and the switching element 17. When the switching element 17 is changed to the OFF state from this state (while the switching element 18 is in the ON state), a high voltage is generated in the reactor 16 so as to prevent a variation in magnetic flux due to the blocking of current and thus the auxiliary power source 10 is charged via the diode 25 with the voltage obtained by boosting up the output voltage of the battery 7. Therefore, by repeatedly turning on and off the switching elements 17 and 18, the auxiliary power source 10 can be charged. The control circuit 20 monitors the voltage $V_C$ of the auxiliary power source 10, and turns on and off the switching elements 17 and 18 via the driving circuit 19 to charge the auxiliary power source 10 when the voltage $V_C$ does not reach a predetermined voltage. This charging operation is performed, for example, when the torque sensor 22 does not detect the steering torque.

Figure 2:
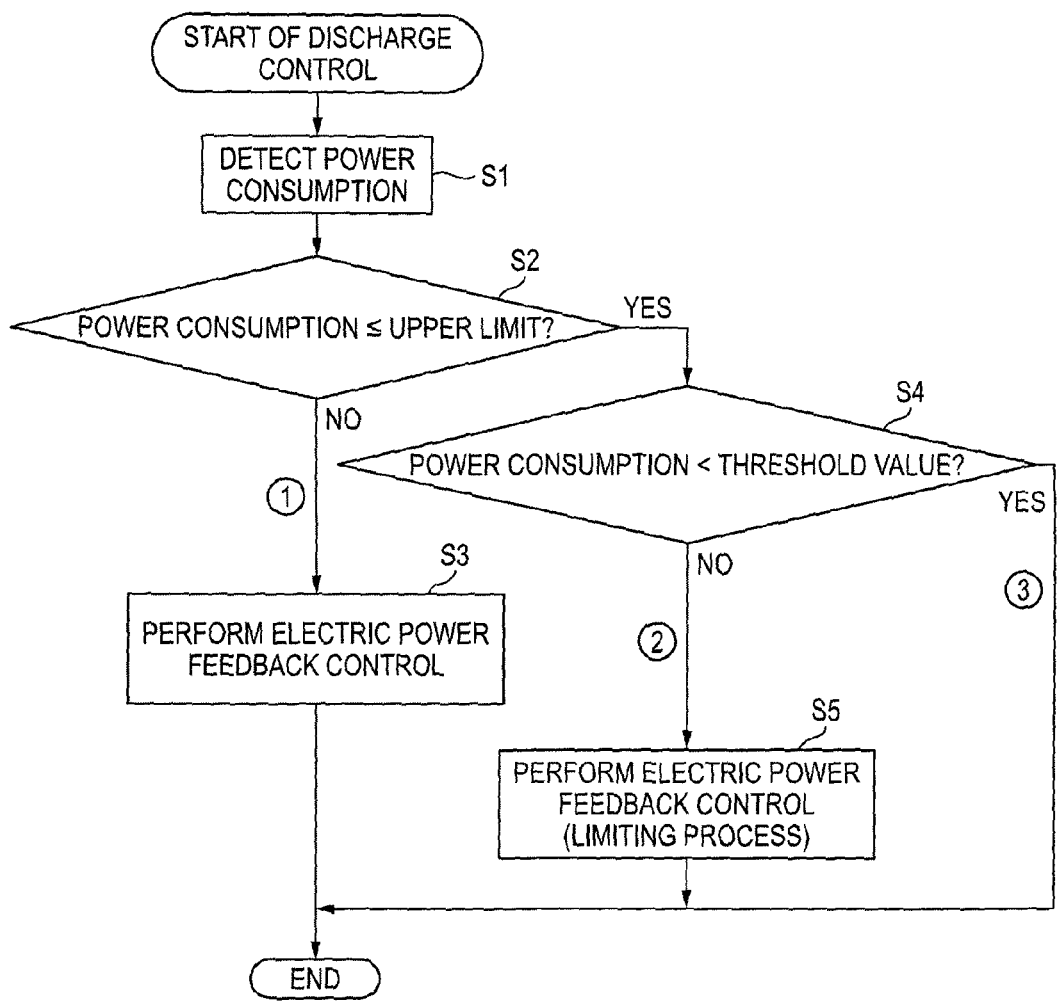
FIG. 2 is a flowchart illustrating the flow of a discharge control.

The operation of the discharge circuit 15 will be described with reference to the flowchart of FIG. 2. The discharge control process shown in the flowchart of FIG. 2 is repeatedly performed by the control circuit 20. First, the control circuit 20 detects the present power consumption of the battery 7 on the basis of the multiplication of the output signals of the current detector 8 and the voltage detector 9 (step S1) and determines whether the power consumption is equal to or less than an upper limit (step S2). Here, the upper limit is the maximum value of the power consumption which can be supplied from only the battery 7. When the power consumption is greater than the upper limit, an electric power feedback control to be described later is performed (step S3).

On the other hand, when it is determined in step S2 that the power consumption is equal to or less than the upper limit, the control circuit 20 subsequently determines whether the power consumption is smaller than a threshold value (step S4). Here, the threshold value is a predetermined value smaller than the upper limit. When it is determined in step S4 that the power consumption is smaller than the threshold value, the flow of processes is ended. When it is determined that the power consumption is equal to or greater than the threshold value, an electric power feedback control (including a limiting process) to be described later is performed (step S5).

Figure 3:
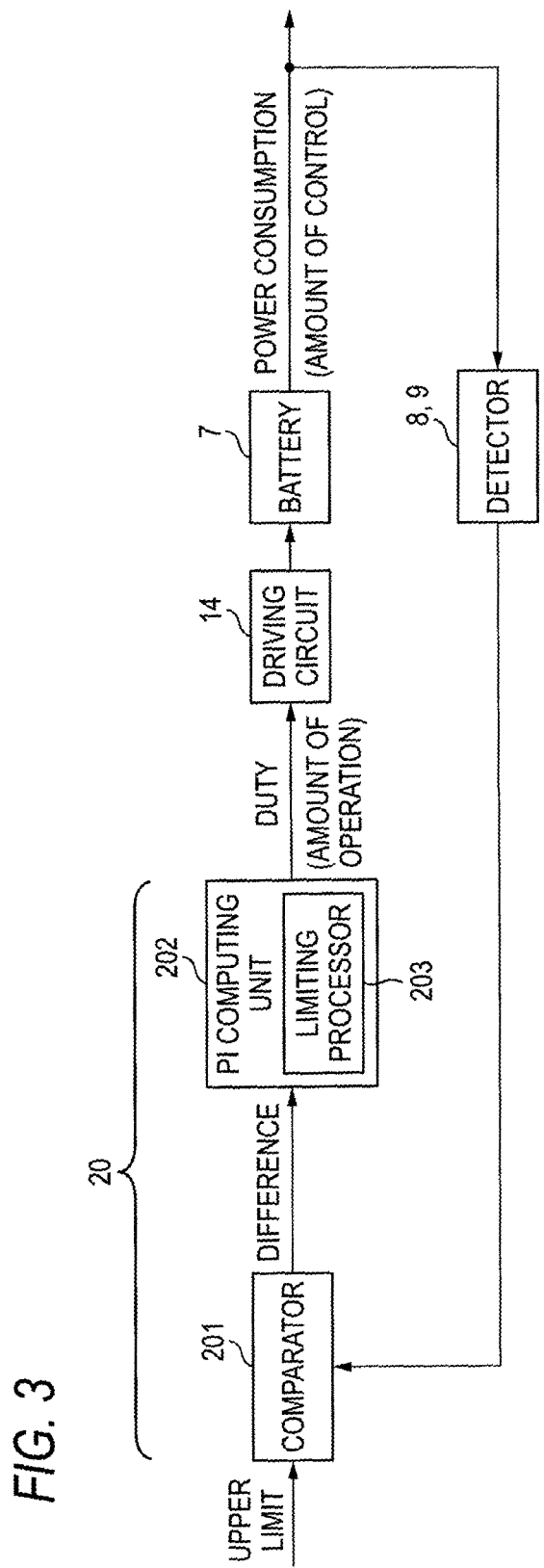
FIG. 3 is a diagram illustrating the configuration of a control system for an electric power feedback control.

FIG. 3 is a diagram illustrating the configuration of a control system for the electric power feedback control. In the drawing, a comparator 201 in the control circuit 20 compares the upper limit with the power consumption of the battery 7 fed back from the detectors 8 and 9 (the current detector 8 and the voltage detector 9) and a PI computing unit 202 performs a PI computation on the basis of the difference between the upper limit and the power consumption. The difference is defined as a positive value when the fed-back power consumption of the battery 7 is greater than the upper limit. On the contrary, when the power consumption is smaller than the upper limit, the difference is defined as a negative value.

The PI computing unit 202 includes a limiting processor 203. When the difference is not a negative value (that is, it is a positive value or 0), the limiting processor 203 does not perform any operation and the PI computing unit 202 outputs a duty as an amount of operation of the control system. When the difference is a negative value, the limiting processor 203 forcibly outputs a duty zero (limiting process). This duty is used when the driving circuit 14 of the discharge circuit 15 performs the PWM control on the switching elements 12 and 13. For example, when the duty is 1, the switching element 13 is continuously in the ON state and the switching element 12 is continuously in the OFF state. On the contrary, when the duty is zero, the switching element 12 is continuously in the ON state and the switching element 13 is continuously in the OFF state.

When the duty is a value in the range of zero to 1, the ratio of the ON time of the switching element 13 (the OFF time of the switching element 12) varies depending on the value of the duty. When the ratio of ON time of the switching element 13 increases, the electric power supplied from the auxiliary power source 10 increases (but is in the outputable voltage range) and thus the electric power supplied from the auxiliary power source 10 increases, thereby reducing the burden on the battery 7. Therefore, it is possible to control the power consumption of the battery 7. By this electric power feedback control, the difference smoothly returns to 0, that is, the power consumption of the battery 7 smoothly returns to the upper limit.

Figure 4:
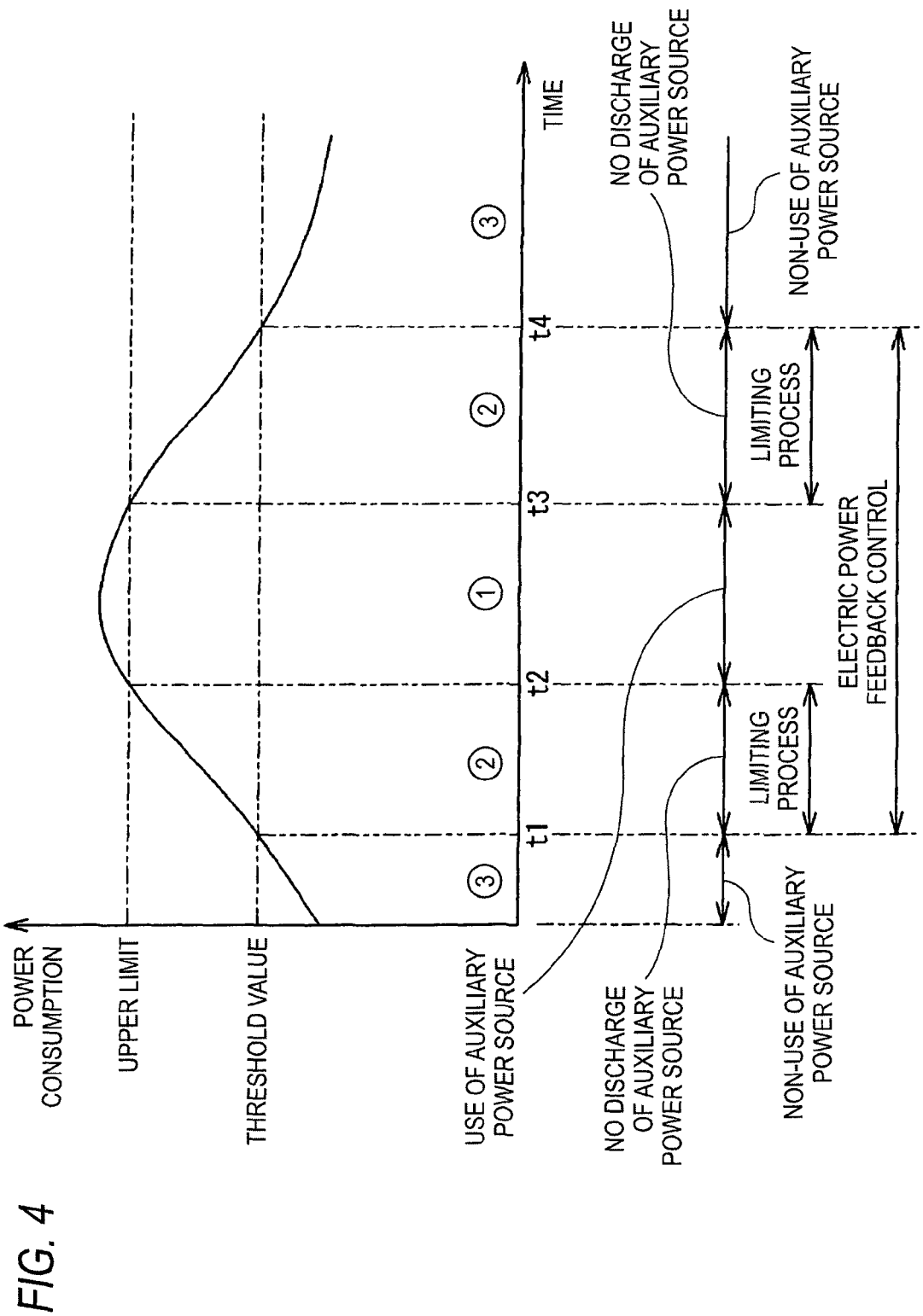
FIG. 4 is a graph illustrating an example of how to use an auxiliary power source with a variation in power consumption of the battery.

FIG. 4 is a graph illustrating an example of how to use the auxiliary power source 10 with the variation in power consumption of the battery 7. Numerals in the drawing correspond to the reference numerals in the processing route shown in the flowchart of FIG. 2. In FIG. 4, when the power consumption of the battery 7 is changed like the shown curve, the power consumption is smaller than both of the upper limit and the threshold value before the time point of time t1. In this case, the auxiliary power source 10 is not used, the switching element 12 shown in FIG. 1 is turned on, and the switching element 13 is turned off, whereby the necessary electric power is supplied to the motor 5 from only the battery 7.

At time t1, the power consumption reaches the threshold value and the electric power feedback control is started along with the limiting process. Accordingly, the PI computation is started on the basis of the difference, but the duty is zero due to the limiting process. When the duty is zero, the switching element 12 in FIG. 1 is turned on and the switching element 13 is turned off, whereby the motor 5 is supplied with the necessary electric power from only the battery 7. That is, the auxiliary power source 10 does not discharge the electric power. This state is maintained up to time t2, and the power consumption becomes greater than the upper limit at the time point after time t2.

As soon as the power consumption becomes greater than the upper limit, the electric power feedback control is performed without the limiting process, and the duty in the PWM control of the driving circuit 14 is set to cancel the difference. Therefore, the motor 5 is supplied with electric power from the power source in which the auxiliary power source 10 is connected in series to the battery 7 and thus the power load of the battery 7 is reduced. As a result, the power consumption returns to the upper limit at time t3, and the electric power feedback control with the limiting process is performed from time t3 to time t4. Therefore, the PI computation is performed on the basis of the difference, but the duty is zero due to the limiting process. When the duty is zero, the switching element 12 in FIG. 1 is turned on and the switching element 13 is turned off, whereby the motor 5 is supplied with the necessary electric power from only the battery 7. That is, the auxiliary power source 10 does not discharge power.

After time t4, the power consumption becomes smaller than the upper limit and the threshold value. Therefore, the electric power feedback control is stopped. Accordingly, the electric power feedback control is stopped after the power consumption is sufficiently lowered, and thus a useless electric power feedback control need not be performed when the power consumption of the battery 7 is small. In this state, the auxiliary power source 10 is not used, the switching element 12 in FIG. 1 is turned on, and the switching element 13 is turned off, whereby the motor 5 is supplied with the necessary electric power from only the battery 7.

In this way, on the basis of the power consumption of the battery 7, by setting the duty on the basis of the difference in the electric power feedback control when the power consumption of the battery 7 is greater than the upper limit, the electric power corresponding to the difference is supplied from the auxiliary power source 10 and thus the power consumption of the battery 7 smoothly returns to the upper limit. In this case, even when the voltage of the auxiliary power source 10 varies, it is possible to supply desired electric power from the auxiliary power source 10. Therefore, it is possible to stably supply auxiliary electric power at the time of using the auxiliary power source 10.

Since the electric power feedback control (with the limiting process) is started before the power consumption becomes greater than the upper limit, and the PI computation is performed, the discontinuity in control at the time of starting the electric power feedback control can be prevented from appearing at the same time as the discharge start of the auxiliary power source 10. Accordingly, by repeatedly performing the switching start and stop (which are not the ON and OFF of the switching in the PWM control, but the switching operation state or not) of the switching elements 12 and 13, it is possible to prevent the generation of noise. It is also possible to prevent the variation in torque of the motor 5.

On the contrary, when the power consumption is lowered to be equal to or less than the upper limit but before the power consumption becomes smaller than the threshold value, the electric power feedback control (with the limiting process) is continuously performed. Accordingly, even when the power consumption varies in the vicinity of the upper limit, it is possible to prevent the discontinuity in control from appearing at the same time as re-starting the discharge of the auxiliary power source 10, as described above.

In the above-mentioned embodiment, when the power consumption which is temporarily greater than the upper limit becomes equal to or less than the upper limit, the discharge of the auxiliary power source 10 is stopped, but a different control may be performed. For example, when the power consumption minutely varies in the vicinity of the upper limit and the power consumption instantaneously becomes equal to or less than the upper limit after the auxiliary power source 10 once starts the discharge, the discharge may not be immediately stopped (that is, the limiting process is held back) and the discharge of the auxiliary power source 10 may be continuously performed until the duty becomes zero.

Figure 5:
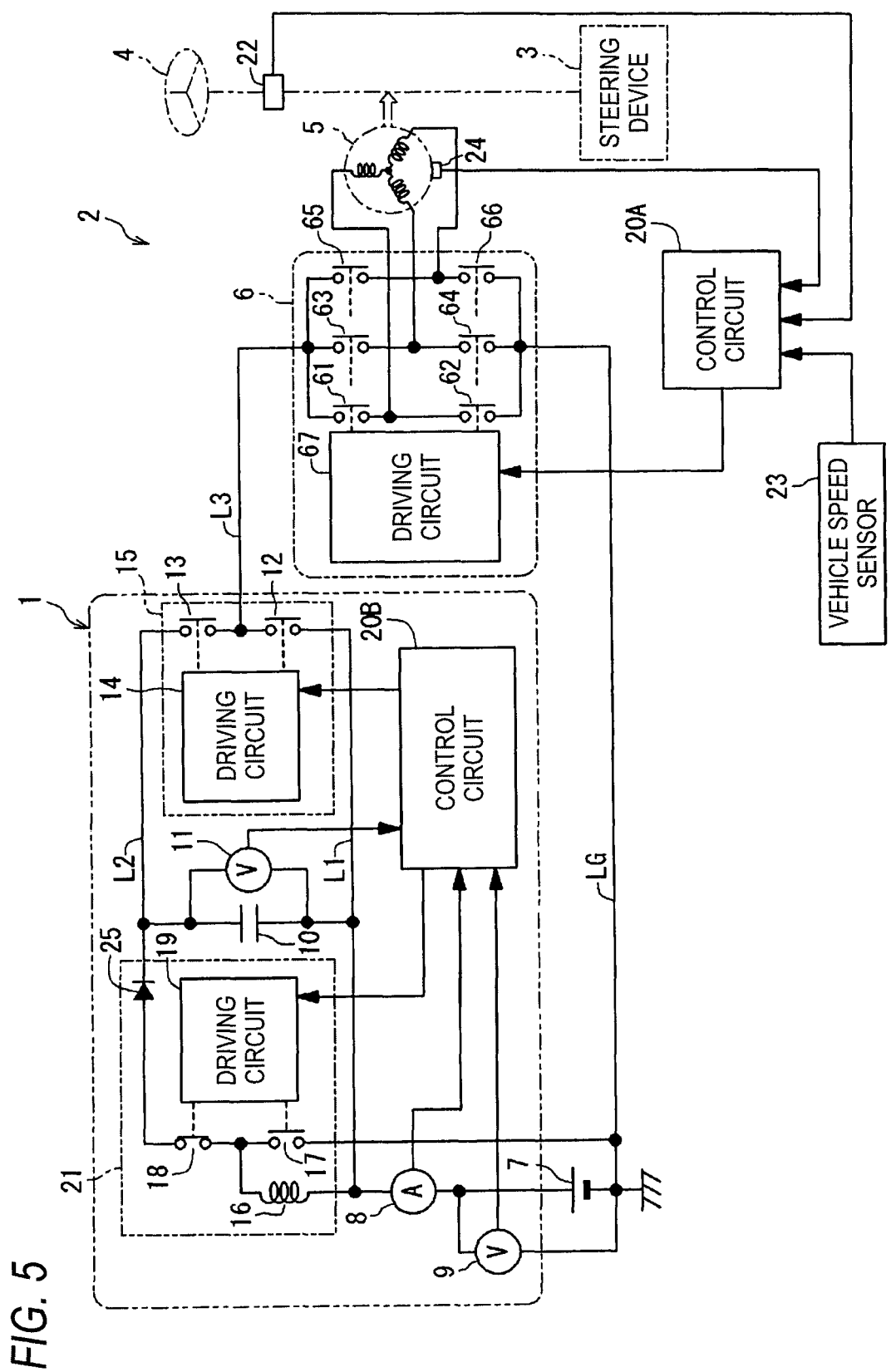
FIG. 5 is a circuit diagram illustrating a modified example of the configuration shown in FIG. 1, where a control circuit for a motor driving circuit and a control circuit for an auxiliary power supply device are separately provided.

In the above-mentioned embodiment, the control circuit 20 also controls the motor driving circuit 6, but a control circuit controlling the motor driving circuit 6 and a control circuit controlling the auxiliary power source 10 may be separately provided. FIG. 5 is a circuit diagram illustrating an example of the control circuits. In this case, a control circuit 20A controls the motor driving circuit 6 and a control circuit 20B controls the auxiliary power source 10. According to this configuration, the power source control may be performed independently of the motor control and the auxiliary power supply device 1 can realize so-called self-contained power management. Accordingly, it is not necessary to customize the auxiliary power supply device 1 depending on the motor specification, thereby contributing to the decrease in cost. The auxiliary power supply device 1 may be constructed as a unit.

The invention is based on Japanese Patent Application No. 2008-049332, filed on Feb. 29, 2008, contents of which are incorporated herein by reference.

INDUSTRIAL APPLICABILITY

It is possible to provide an auxiliary power supply device that can always supply stable auxiliary power at the time of using an auxiliary power source and an electric power steering device employing the auxiliary power supply device.

The invention claimed is:

1. An auxiliary power supply device comprising:
an auxiliary power source connected in series to a battery for supplying electric power to a motor;
a power detecting section that detects power consumption of the battery;
a charging circuit that charges the auxiliary power source by using the battery;
a discharge circuit that selectively constitutes a first state where the motor is supplied with electric power from only the battery and a second state where the motor is supplied with electric power from both the battery and the auxiliary power source by turning on and off a switching element; and
a control circuit that performs an electric power feedback control of turning on and off the switching element by a pulse width modulation control with a duty based on a difference between the power consumption detected by the power detecting section and a first threshold value,
wherein when the power consumption is greater than the first threshold value, the control circuit performs the electric power feedback control with the duty based on the difference so that the power consumption returns to the first threshold value.

2. The auxiliary power supply device according to claim 1, wherein when the power consumption is within a range of the first threshold value and a second threshold value smaller than the first threshold value, the control circuit performs the electric power feedback control with the duty zero so that the discharge circuit constitutes the first state.

3. The auxiliary power supply device according to claim 2, wherein when the power consumption is smaller than the second threshold value, the control circuit stops the electric power feedback control.

4. The auxiliary power supply device according to claim 3, wherein the control circuit includes a computing unit which computes the difference to output the duty, and the computing unit computes the difference when the control circuit performs the electric power feedback control.

5. An electric power steering device for generating steering assist force by the use of a motor, comprising:
a battery that supplies electric power to the motor;
an auxiliary power source connected in series to the battery;
a power detecting section that detects power consumption of the battery;
a charging circuit that charges the auxiliary power source by using the battery;
a discharge circuit that selectively constitutes a first state where the motor is supplied with electric power from only the battery and a second state where the motor is supplied with power from both the battery and the auxiliary power source by turning on and off a switching element; and
a control circuit that performs an electric power feedback control of turning on and off the switching element by a pulse width modulation control with a duty based on a difference between the power consumption detected by the power detecting section and a first threshold value,
wherein when the power consumption is greater than the first threshold value, the control circuit performs the electric power feedback control with the duty based on the difference so that the power consumption returns to the first threshold value.

* * * * *